(12) United States Patent
Karlsson et al.

(10) Patent No.: US 8,456,867 B1
(45) Date of Patent: Jun. 4, 2013

(54) START-UP PROCEDURE FOR AN ISOLATED SWITCHED MODE POWER SUPPLY

(75) Inventors: Magnus Karlsson, Oskarshamn (SE); Anders Kullman, Kalmar (SE); Jonas Malmberg, Färjestaden (SE); Fredrik Wahledow, Färjestaden (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 6 days.

(21) Appl. No.: 13/383,632

(22) PCT Filed: Dec. 1, 2011

(86) PCT No.: PCT/EP2011/071488
§ 371 (c)(1),
(2), (4) Date: Jan. 12, 2012

(51) Int. Cl.
*H02M 3/335* (2006.01)
*H02M 7/10* (2006.01)

(52) U.S. Cl.
USPC ............ 363/17; 363/49; 363/50; 363/95; 363/98; 363/131; 363/132; 323/901; 323/908

(58) Field of Classification Search
USPC .... 363/17, 49, 50, 95, 98, 131, 132; 323/901, 323/908
See application file for complete search history.

(56) References Cited

U.S. PATENT DOCUMENTS

| | | | | |
|---|---|---|---|---|
| 4,764,857 A | * | 8/1988 | Konopka | 363/49 |
| 5,363,020 A | * | 11/1994 | Chen et al. | 315/209 R |
| 5,586,016 A | * | 12/1996 | Konopka et al. | 363/21.01 |
| 6,301,129 B1 | * | 10/2001 | Yasumura | 363/21.03 |
| 7,136,294 B2 | * | 11/2006 | Phadke et al. | 363/132 |
| 8,327,159 B2 | * | 12/2012 | Newman, Jr. | 713/300 |
| 2005/0225374 A1 | | 10/2005 | Ribarich et al. | |
| 2007/0126497 A1 | | 6/2007 | Palaniappan et al. | |
| 2009/0027925 A1 | * | 1/2009 | Kanouda et al. | 363/21.13 |
| 2009/0143920 A1 | * | 6/2009 | Newman, Jr. | 700/298 |
| 2010/0052648 A1 | | 3/2010 | Iwabuchi et al. | |
| 2011/0164438 A1 | | 7/2011 | Appelberg | |

* cited by examiner

*Primary Examiner* — Bao Q Vu (57) ABSTRACT

An isolated switched mode power supply (SMPS) is disclosed. The SMPS comprises a switching controller to generate start-up and operational switching control signals. The SMPS further includes a transformer, having a primary winding, and a full-bridge drive circuit to drive the primary winding. The full-bridge drive circuit comprises a first switching element, a boot-strap driving circuit, and a second switching element. The switching controller is further used to start up isolated SMPS by determining a duty cycle for operational control signals and generating the start-up switching control signals.

14 Claims, 7 Drawing Sheets

START-UP PROCEDURE FOR AN ISOLATED SWITCHED MODE POWER SUPPLY

TECHNICAL FIELD

The present invention generally relates to the field of isolated switched mode power supplies (sometimes referred to as isolated switch mode power supplies, isolated switching mode power supplies or isolated switching converters) and more specifically to the start-up of an isolated switched mode power supply having a full-bridge primary side topology.

BACKGROUND

The switched mode power supply (SMPS) is a well-known type of power converter having a diverse range of applications by virtue of its small size and weight and high efficiency, for example in personal computers and portable electronic devices such as cell phones. An SMPS achieves these advantages by switching one or more switching elements such as power MOSFETs at a high frequency (usually tens to hundreds of kHz), with the frequency or duty cycle of the switching being adjusted using a feedback signal to convert an input voltage to a desired output voltage. An SMPS may take the form of a rectifier (AC-to-DC converter), a DC-to-DC converter, a frequency changer (AC-to-AC) or an inverter (DC-to-AC). Commonly, to minimise power loss in a power distribution system, the power is distributed at high voltage levels and then transformed to the required level near the load using a rectifier or DC-to-DC converter.

Figure 1:
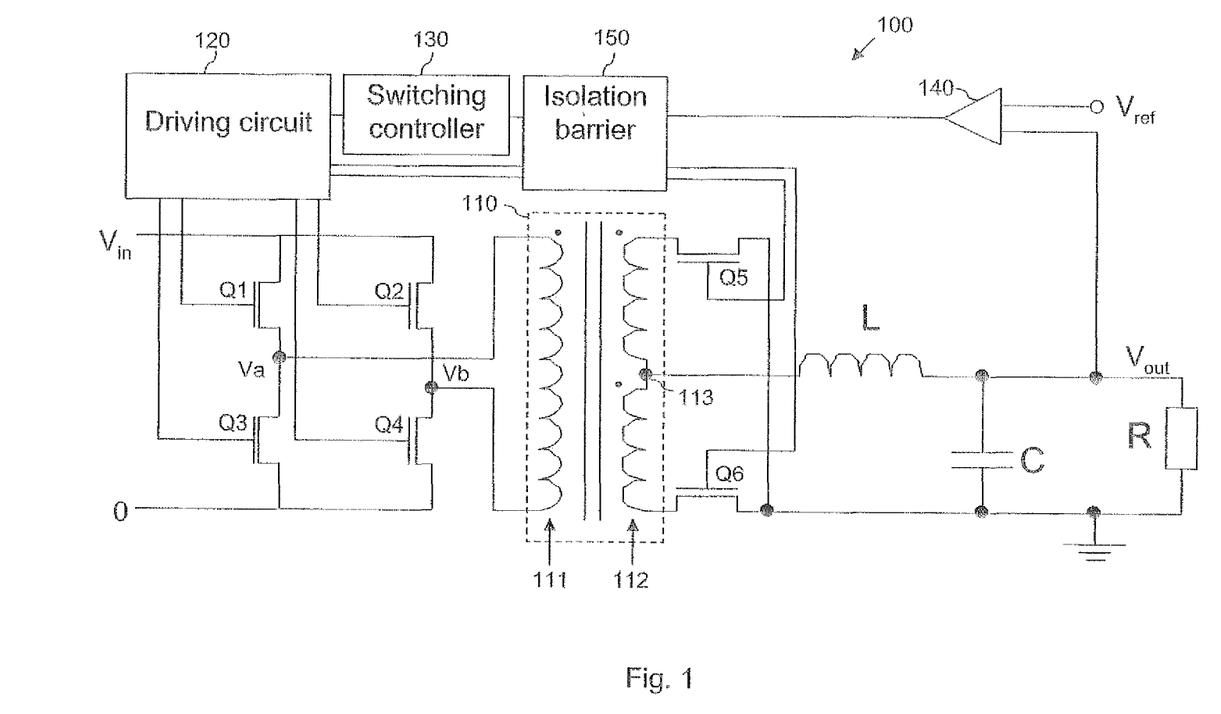
FIG. 1 shows a background example isolated SMPS with a full-bridge primary side topology.

FIG. 1 shows a background example of a hard-switched, isolated SMPS, i.e. an SMPS which converts an input voltage $V_{in}$ to an output voltage $V_{out}$ whilst isolating the input from the output through an isolation transformer. The SMPS 100 is provided in the form of a full-bridge (DC-to-DC) converter which has on its primary side a primary side drive circuit having transistors Q1, Q2, Q3 and Q4 (which may, for example, be field-effect transistors such as MOSFETs or IGBTs) which are connected between the power supply's inputs and to the primary winding 111 of the isolation transformer 110 in a full-bridge arrangement, as shown. The transistors Q1 to Q4 are thus configured to drive the primary winding 111 in response to switching control signals applied thereto. In high-power applications, higher converter efficiency can often be achieved with the full-bridge primary side topology than with other topologies, such as half-bridge or push-pull.

The switching of the transistors is controlled by a switching control circuit comprising a switch driving circuit 120, a switching controller 130 in the form of a pulse width modulation (PWM) controller, and a feedback signal generator 140. The driving circuit 120 comprises a pulse width modulator which generates respective drive pulses to be applied to the gates of transistors Q1 to Q4 in order to turn the transistors ON or OFF, the drive pulses being generated in accordance with switching control signals provided to the drive circuit 120 by the switching controller 130. In turn, the switching controller 130 is arranged to receive a feedback signal generated by the feedback signal generator 140, which in this example is provided in the form of an error amplifier. The feedback signal generated by the feedback signal generator 140 provides a measure of the difference between the output of the SMPS 100 (here, the output voltage $V_{out}$) and a reference for the output, which is a reference voltage $V_{ref}$ in the present example. In the present example, the feedback signal from the feedback signal generator 140 passes through an electrical isolation barrier 150 (e.g. one or more opto-electric converters) provided between the primary and secondary side circuits of the SMPS 100.

FIG. 1 also shows a standard topology on the secondary side of the isolated SMPS 100, which includes a rectifying circuit and an LC filter connected to a load R. The inductor L of the LC filter is connected to the secondary winding 112 of the transformer 110. A centre-tap (or "mid-tap") 113 is provided between a first portion of the secondary winding 112 having $n_2$ turns and a second portion of the winding 112 also having $n_2$ turns. In the present example, the rectifying network in the secondary side circuit employs two transistors, Q5 and Q6, to yield full-wave rectification of the voltage induced in the secondary winding 112. Each of the switching devices Q5 and Q6 can take any suitable or desirable form, and are preferably field-effect transistors in the form of a MOSFET or an IGBT, for example. In the example of FIG. 1, the switch devices Q5 and Q6 have an internal body drain diode, which is not shown in the switch device symbol in FIG. 1. The switching of these transistors is controlled by the same controller circuit that controls the switching of transistors Q1 to Q4, namely that comprising the drive circuit 120, the switching controller 130 and the feedback signal generator 140. As shown in FIG. 1, the switching control signals for transistors Q5 and Q6 generated by the switching controller 130 also pass through the electrical isolation barrier 150.

The control circuit drives transistors Q1 to Q6 such that the switching of the primary side transistors Q1 to Q4 is synchronized with that of the secondary side transistors Q5 and Q6, as will be explained in the following. It is noted that the switching controller 130 may alternatively be located on the secondary side of the SMPS circuit shown in FIG. 1. In other words, the switching controller 130 and the isolation barrier 150 in FIG. 1 may be interchanged. In that case, the driving circuit may also be located on the secondary side, with the switching control signals for transistors Q1 to Q4 passing through the isolation barrier 150.

The principles of operation of the SMPS shown in FIG. 1 will be familiar to those skilled in the art, such that a detailed explanation thereof is unnecessary here. Nevertheless, some of the features necessary to assist understanding of present invention will now be discussed.

Figure 2:
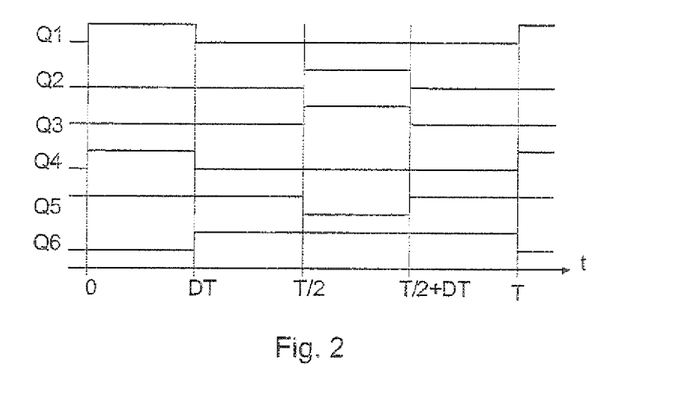
FIG. 2 is a conventional switch timing diagram according to which the isolated SMPS shown in FIG. 1 operates.

FIG. 2 shows the switching cycle diagram in accordance with which the gate electrodes of switches Q1 to Q6 in FIG. 1 are driven by the SMPS control circuit so that the primary side circuit generates a series of voltage pulses to be applied to the primary winding 111 of the transformer 110. In FIG. 2, "D" represents the duty cycle of the primary side switching and "T" the switching period. The operation of the circuit during the four time periods 0 to DT, DT to T/2, T/2 to (T/2+DT) and (T/2+DT) to T is as follows.

Time period 1 (0<t<DT): Switching devices Q1 and Q4 are switched ON while Q2 and Q3 are OFF, allowing the input source at $V_{in}$ to drive a current through the primary winding 111 of the transformer 110. During this period, switching device Q5 is switched ON while device Q6 is switched OFF, allowing the source to transfer energy to the load R via the secondary winding 112 of the transformer 110. The output voltage $V_{out} = n_2/n_1 \cdot V_{in} \cdot D$, where $n_1$ is the number of turns in the primary winding.

The operation of the half-bridge isolated buck converter of FIG. 1 is to be contrasted with that of a flyback converter (or a combined forward/flyback converter), where energy is stored in an air gap provided in the transformer core during this period, to be subsequently released into the secondary side circuit when the primary winding of the transformer is not being driven. No such air gap is present in the core of transformer 110 shown in FIG. 1 or in any of the related circuits described in the embodiments.

Time period 2 (DT<t<T/2): Switches Q5 and Q6 are both conducting and the current in the secondary side circuit therefore free-wheels through both portions of the secondary side winding in substantially equal measure, allowing the transformer flux to be balanced. In other words, the free-wheeling current generates two magnetic fluxes within the secondary winding with opposite directions in the vicinity of the centre-tap 113, yielding a net magnetic flux equal to zero in an area between the first and second portions of the secondary winding 112. Hence, the transformer core magnetization is balanced to zero, and the current in the primary winding during the free-wheeling period DT-T/2 is suppressed, thereby avoiding losses in the primary winding. Thus, the transformer volt-second balance is obtained over the switching period T so that a transformer reset is unnecessary.

Time period 3 (T/2<t<T/2+DT): In this interval, switching devices Q1 and Q4 are OFF while devices Q2 and Q3 are switched ON, exciting the primary winding 111 with a voltage of opposite polarity to that in the first time period described above. On the secondary side, switch Q6 remains ON while switch Q5 is turned OFF, allowing the EMF generated in the lower portion of the secondary winding to drive a current through the inductor L.

Time period 4 (T/2+DT<t<T): The operation proceeds as in time period 2 described above.

Before the above-described operation is established, the SMPS 100 is required to start up from an inoperative state, and in some cases against a bias voltage at its output that is provided by the load circuitry connected to the SMPS 100, i.e. to perform a so-called "pre-bias start". If this bias is not taken into account during start-up, the output will be pulled to a level dictated by the internal reference $V_{ref}$, which can damage the load circuitry. This can be avoided by setting the reference to a value corresponding to the output voltage, or by delaying the start the SMPS 100 until the reference $V_{ref}$ has reached the correct value. Typical solutions to this problem involve gradual start-up of the switching elements Q5 and Q6 by ramping up the gate voltage to achieve the desired performance. However, if the SMPS 100 performs a pre-bias start with the switching elements being driven according to the timing sequence shown in FIG. 2 from the outset, the magnetisation in the transformer 110 acquires an initial offset, which is manifested in a transient in the output voltage $V_{out}$ of the SMPS 100.

To address this problem, WO 2009/154545 A1 discloses a pre-bias start-up procedure in which the duration of an initial voltage pulse applied to the primary side circuit is reduced in relation to the pre-determined duration of subsequent pulses, which is set by the switching controller 130 on the basis of a determined (e.g. measured) initial value of $V_{out}$. The duration of this initial pulse is preferably 50% of the pre-determined pulse width.

Figure 3:
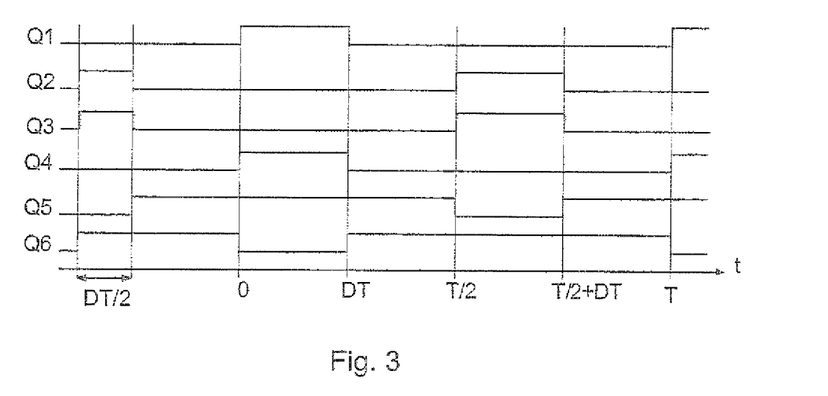
FIG. 3 shows a background example start-up switch timing diagram according to which the isolated SMPS shown in FIG. 1 starts up.

FIG. 3 shows an example of the switch timing sequence of this improved SMPS start-up procedure, which may be used in the SMPS 100 of FIG. 1. As shown in FIG. 3, an initial pulse of duration DT/2 is applied to each of transistors Q2 and Q3 prior to the start of conventional switching at time t=0, which proceeds according to the timings illustrated in FIG. 2. The initial shortened pulse has the effect of balancing the flux in the transformer 110, thereby reducing the initial offset in its magnetisation and the consequent transient in the power supply's output voltage. This initial reduced-length pulse is hereafter referred to as the "transformer flux balancing pulse". Start-up of the SMPS using the transformer flux balancing pulse has the further advantage of allowing the SMPS 100 to start up quickly, without any gradual ramp-up of the transistor drive voltage. Furthermore, this solution (hereafter referred to as "reduced-pulse transformer balancing") can be implemented simply by modifying the switching controller 130 and is therefore much simpler and cheaper to implement than known solutions devised in the analog domain, which typically require complex start-up nets to delay the turn-on of the transistors, rapidly charge the reference $V_{ref}$, or similar.

SUMMARY OF THE INVENTION

Despite its advantages, the present inventors have found that the reduced-pulse transformer balancing procedure disclosed in WO 2009/154545 A1 may in some circumstances cause a dip in the converter's output voltage shortly after start-up, causing it to temporarily sink current from the load circuitry. This is a particular problem because, in some applications, the load circuitry may be sensitive to such low-level current sinking by the attached converter and sustain damage as a result.

The present inventors have realised that the reduced-pulse transformer balancing procedure can be made more versatile by modifying the converter's start-up switching sequence in a way which overcomes two problems that they found to occur in the full-bridge drive circuit during start-up.

The first of the problems found by the inventors lies in the initialisation of the high-side drivers that form part of the driving circuit 120 and drive the high-side transistors in the full-bridge drive circuit on the primary side i.e. transistors Q1 and Q2 in the example of FIG. 1). More particularly, the present inventors have found that the switching sequence shown in FIG. 3 does not allow the high-side transistor to switch ON to the extent required to achieve transformer balancing. The cause of this problem has been identified by the inventors and will now be explained with reference to FIG. 4

Figure 4:
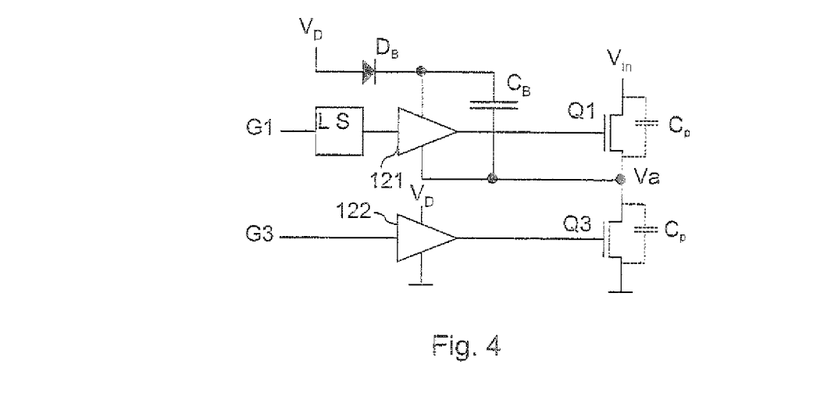
FIG. 4 illustrates a portion of the driving circuit of FIG. 1, which has a boot-strap driving circuit arranged to drive a high-side switching element of the full-bridge primary-side circuit.
Figure 5:
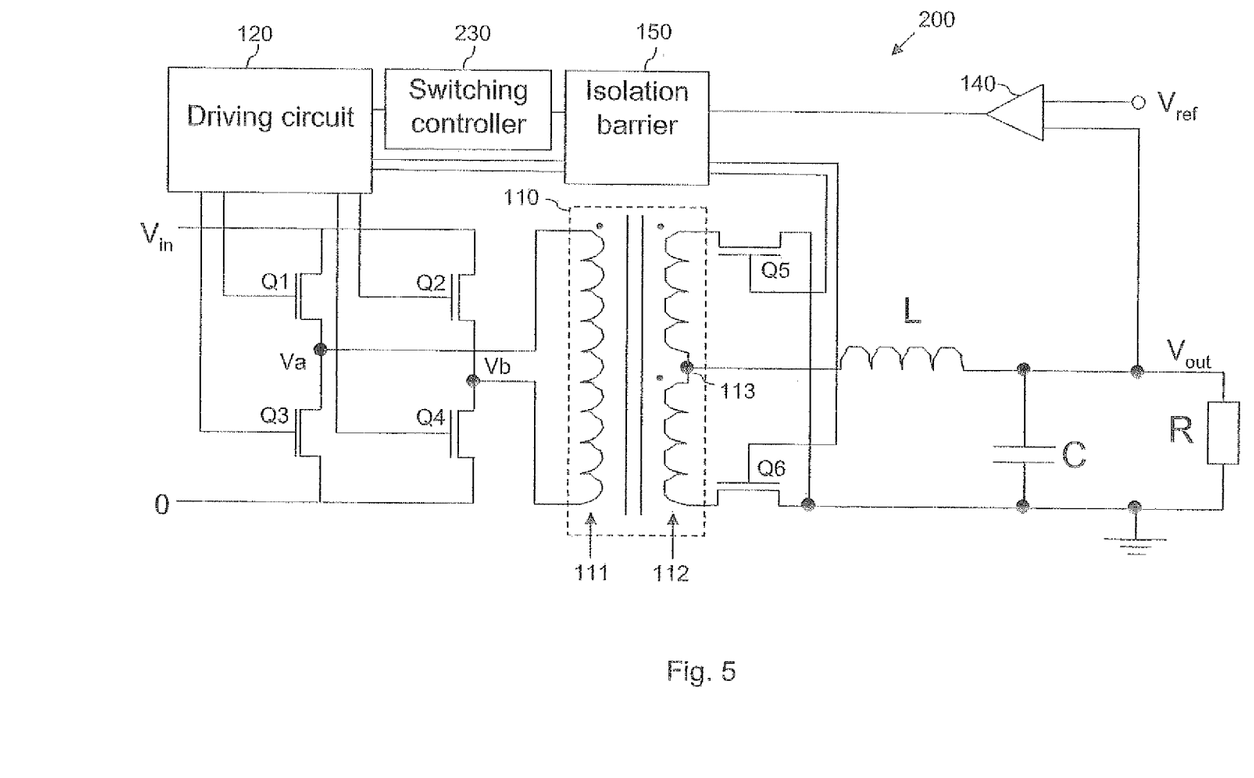
FIG. 5 shows an isolated SMPS according to a first embodiment of the present invention.

FIG. 4 is a simplified illustration of a portion of the driving circuit 120 which is arranged to apply drive signals to the gates of the transistors in the full-bridge drive circuit. Although only the portion of the driving circuit which drives transistors Q1 and Q3 is illustrated in FIG. 4 for simplicity, it is to be understood that another portion of the driving circuit 120, which is the same as that illustrated in FIG. 4, is used to drive the remaining transistors of the full-bridge drive circuit, namely Q2 and Q4.

In FIG. 4, the high-side transistor Q1 is switched by a boot-strap driving circuit which comprises an amplifier 121 as well as a boot-strap diode $D_B$ and a boot-strap capacitor $C_B$, which are connected to the amplifier's power supply terminals and to an amplifier supply voltage $V_D$, as shown. The amplifier 121 is configured to generate drive signals for Q1 in response to a switching control signal G1 from the switching controller 130. Since the switching control signal G1 is referenced to ground and the high-side driver is floating, a level shifter LS is used to appropriately condition the switching control signal G1.

In FIG. 4, the low-side transistor Q3 is switched by an amplifier 122, whose power supply terminals are connected to $V_D$ and ground. The amplifier 122 is configured to generate drive signals for Q3 in response to a switching control signal G3 from the switching controller 130. As shown in FIG. 4, the low-side transistor Q3 is connected both to the high-side transistor Q1 and to the boot-strap driving circuit of Q1.

In typical telecommunications applications, the driving voltage $V_D$ may be in the neighbourhood of 5-10V. This driving voltage is derived from the SMPS input voltage and hence $V_D$ will increase after the input voltage $V_{in}$. During start-up, when the input voltage $V_{in}$ is rising, the node Va shown in FIG. 4 divided to a voltage around 12V by the parasitic capacitances $C_p$ of the transistors Q1 and Q3. The driver voltage $V_D$, however, may only be 5-10V at this time. With the capacitance of the boot-strap capacitor $C_B$ usually being 10 times larger than the parasitic capacitance $C_p$ of each transistor, the boot-strap capacitor $C_B$ will not be adequately charged when applying the input voltage $V_{in}$ in this example. One way of charging the boot strap capacitor $C_B$ is to switch ON the low-side switching element Q3. Before this is done, Q1 can not be switched ON. Thus, the inventors have identified the need to adequately charge, before the reduced-pulse transformer balancing is performed, the boot-strap capacitor $C_B$ of at least a switching element that will be switched ON by the transformer flux balancing pulse.

The second problem found by the inventors arises in the full-bridge drive circuit during start-up relates to the intrinsic capacitances of the switching elements, which are illustrated by equivalent capacitors $C_p$ in FIG. 4. The inventors have found that the reduced-pulse balancing is affected by the voltages that occur at start-up at nodes Va and Vb, due to the capacitive voltage divider caused by the parasitic capacitances. Transistors Q1 to Q4 are usually identical devices having roughly the same amount of parasitic capacitance. This causes the voltage at Va and Vb to be nearly half the input voltage $V_{in}$ when the input voltage is applied. The voltages at Va and Vb affect the reduced-pulse transformer balancing since the flux introduced into the transformer does not correspond to half the peak-to-peak flux. The inventors have thus also identified the need to discharge the parasitic capacitances of at least some of the switching elements Q1 to Q4 before performing the reduced-pulse transformer balancing.

Having identified these problems, the present inventors have devised an SMPS start-up procedure employing a switching sequence that improves the effectiveness of the transformer flux balancing pulse (the first energy transferring pulse) by charging the boot-strap capacitor for the high-side switching element that will be switched by the transformer flux balancing pulse whilst at the same time discharging the parasitic capacitance of at least one low-side switching device on the primary side. The improved SMPS start-up switching sequence devised by the inventors includes, in addition to the transformer flux balancing pulse, a short prior initialisation voltage pulse, which is shorter than the transformer flux balancing pulse and is applied to temporarily switch ON a low-side switching element in the full-bridge drive circuit before the transformer flux balancing pulse switches ON the corresponding high-side switching element. The inventors have found that such a relatively short initialisation pulse can be surprisingly effective not only in discharging the parasitic capacitance of the low-side switching element but also in charging up the larger boot-strap capacitance in the boot-strap circuit that drives the high-side switching element to the extent required to achieve more complete transformer balancing during start-up, thereby substantially reducing or preventing altogether the occurrence of the current sinking discussed above.

More specifically, according to a first aspect of the present invention, there is provided an isolated SMPS comprising: a switching controller operable to generate start-up switching control signals during start-up of the isolated SMPS, and operational switching control signals of period T during subsequent operation of the isolated SMPS; a transformer having a primary winding; and a full-bridge drive circuit arranged to drive the primary winding of the transformer in response to the switching control signals. The full-bridge drive circuit has: a first switching element; a boot-strap driving circuit arranged to switch the first switching element in response to the switching control signals, the boot-strap driving circuit having a boot-strap capacitor; and a second switching element connected to the first switching element and to the boot-strap driving circuit, and arranged to conduct a current to charge the boot-strap capacitor when switched ON in response to the switching control signals. The switching controller is operable to start up the isolated SMPS by: determining a duty cycle D for the operational switching control signals based on a voltage at an output of the isolated SMPS; and generating the start-up switching control signals comprising a first voltage pulse of duration P1 to temporarily switch ON the second switching element, and a subsequent second voltage pulse of duration P2 to temporarily switch ON the first switching element, wherein P1<P2 and P2<DT, where T is a switching period of the isolated SMPS, thereby allowing the boot-strap capacitor to be charged before the first switching element is turned ON by the second voltage pulse.

According to a second aspect of the present invention, there is provided a method of starting up an isolated SMPS which comprises: a switching controller operable to generate start-up switching control signals during start-up of the isolated SMPS, and operational switching control signals of period T during subsequent operation of the isolated SMPS; a transformer having a primary winding; and a full-bridge drive circuit arranged to drive the primary winding of the transformer in response to the switching control signals. The full-bridge drive circuit has: a first switching element; a boot-strap driving circuit arranged to switch the first switching element in response to the switching control signals, the boot-strap driving circuit having a boot-strap capacitor; and a second switching element connected to the first switching element and to the boot-strap driving circuit, and arranged to conduct a current to charge the boot-strap capacitor when switched ON in response to the switching control signals. The method of starting up the isolated SMPS comprises determining a duty cycle D for the operational switching control signals based on a voltage at an output of the isolated SMPS, and generating the start-up switching control signals by: generating a first voltage pulse of duration P1 to temporarily switch ON the second switching element; and generating a subsequent second voltage pulse of duration P2 to temporarily switch ON the first switching element, wherein P1<P2 and P2<DT, T being a switching period of the isolated SMPS. The boot-strap capacitor is thus allowed to charge up before the first switching element is turned ON by the second voltage pulse.

BRIEF DESCRIPTION OF THE DRAWINGS

Embodiments of the invention, which have different performances in terms of power efficiency and cost, will now be explained in detail, by way of example only, with reference to the accompanying figures, in which.

DETAILED DESCRIPTION OF EMBODIMENTS

Isolated switched mode power supplies according to embodiments of the present invention that will now be described in detail have the same full-bridge topology SMPS circuits as the examples which have been described above in the Background and Summary sections with reference to FIGS. 1 and 4, with like reference signs in the figures labelling common components. A description of this hardware will therefore not be repeated here, for sake of brevity.

However, the isolated switching converters of the following embodiments differ from the aforementioned known isolated switching converters in that the switching controller of the embodiments is configured differently so as to perform a different switching sequence to start up the SMPS so as to bring it from an inoperative state, in which no switching control signals are applied, to an operative state in which operational switching control signals are applied to enable the SMPS to convert an input voltage into a prescribed output voltage. These sequences are described below with reference to the timing diagrams in FIGS. 6 to 9. As will be appreciated from the following description, the switching control signals applied to the switching elements of the SMPS from start-up can be divided into three phases, as follows:

Inoperative state:
   No pulses applied.
2. Start-up, comprising:
   Phase 1 pulse—Initialisation discharge of parasitic capacitances, and charging of the boot-strap capacitor; and
   Phase 2 pulse—Reduced-pulse transformer balancing.
3. Working operation, comprising:
   Phase 3 pulses—operational pulses for normal voltage regulation.

First Embodiment

An isolated SMPS 200 according to first embodiment of the present invention is illustrated in FIG. 1. The SMPS 200 differs from the background example of FIG. 1 by the configuration of the switching controller 230.

In particular, the switching controller 230 of the present embodiment is operable to start up the isolated SMPS 200 from an inoperative state by generating start-up switching control signals during start-up of the SMPS 200, and operational switching control signals of period T during subsequent operation of the isolated SMPS 200 in its normal operational mode. In other words, the switching controller 230 is operable control the operation of the SMPS 200 with a set of start-up switching control signals whilst operating in a start-up mode, and with operational switching control signals of period T during subsequent operation of the switching controller 230 in the normal operation mode. In the normal operational mode, the switching controller 230 of the present embodiment regulates the power supply's output voltage $V_{out}$ by setting the switching duty cycle D for the primary side transistors on the basis of the feedback signal provided by the feedback signal generator 140.

In the present embodiment, at start-up, the switching controller 230 is preferably arranged to determine a voltage at an output of the SMPS 200, for example by measuring the output voltage $V_{out}$ using the feedback signal generator 140 or otherwise, using techniques familiar to those versed in the art. Instead of a single measured value, a value derived from more than one measured value, such as a mean or another average value, may be used. The output voltage value may alternatively be stored in a memory device (e.g. a Flash memory) within the switching controller 230 or an external memory device which is accessible to the switching controller 230; in this case, the switching controller may determine the output voltage by retrieving a value from memory that corresponds to a selection (e.g. of a kind of SMPS load) entered by a user of the SMPS 200 using a user interface (e.g. keypad) which is operationally connected to the switching controller 230. The initial output voltage value may alternatively be entered directly by the user via the keypad, for example.

The switching controller 230 is preferably configured to compare the determined output voltage value with a predetermined threshold and, if the output voltage is determined to exceed the predetermined threshold, perform the pre-bias start-up procedure described below. If, on the other hand, the output voltage is determined not to exceed the predetermined threshold, the switching controller 230 may be configured to perform a different start-up procedure, for example to ramp up the output voltage (preferably from a low initial value or zero) to a pre-set value. Alternatively, if the output voltage is determined to exceed a second threshold value greater than the first threshold value (e.g. the maximum output voltage of the SMPS 200) then the switching controller 230 may be configured not to issue any switching control signals and instead provide an indication that the start-up procedure has been suspended (e.g. by generating a signal to light an LED or sound an alarm signal). In this way, the SMPS 200 would be able to start up safely under diverse load conditions.

In the present embodiment, the switching controller 230 is operable to start up the SMPS 200 by determining the duty cycle D for the operational switching control signals based on the determined value of the voltage $V_{out}$. Once this has been done, the switching controller 230 is operable to generate the start-up switching control signals during a single switching period T.

Figure 6:
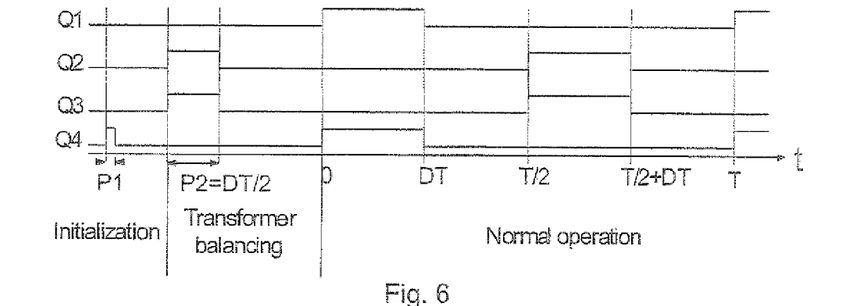
FIG. 6 shows a start-up switch timing diagram according to which the isolated SMPS according to the first embodiment starts up.
Figure 7:
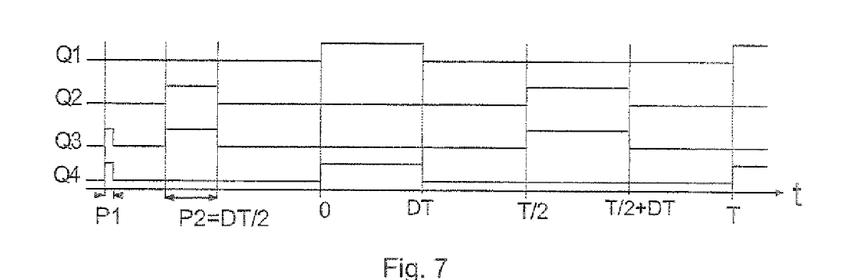
FIG. 7 shows a start-up switch timing diagram according to which an isolated SMPS according to a second embodiment starts up.

As shown in the timing diagram of FIG. 6, the start-up switching control signals comprise a first voltage pulse of duration P1, which is the first pulse to be applied during start-up of the SMPS 200 from an inoperative state, to temporarily switch ON the low-side transistor Q4, and a subsequent second voltage pulse of duration 22, which is the final pulse to be applied during start-up of the SMPS 200, before the SMPS 200 starts operating in the normal operational mode. Thus, the start-up switching control signals of the present embodiment consist of only two pulses, namely the first and second pulses of duration P1 and P2, respectively. The duration P2 of the second voltage pulse is preferably equal to DT/2 or substantially so (e.g. in the range 0.4 T to 0.6 T), to temporarily switch ON the corresponding high-side transistor Q2. As illustrated in FIG. 6, the first voltage pulse P1 is shorter than the second pulse (i.e. the transformer flux balancing pulse) of duration P2. The application of the first pulse F1 allows the boot-strap capacitor $C_B$ of the boot-strap circuit driving Q2 to be charged before Q2 is turned ON by the second voltage pulse, and also shorts the source and drain terminals of transistor Q4, thereby discharging its parasitic capacitance $C_p$.

As an alternative to the timing diagram of FIG. 6, the first pulse may instead be applied to low-side transistor Q3, with the subsequent second pulse being applied to each of Q1 and Q4.

In either case, the switching controller 230 is preferably arranged to start up the isolated SMPS 200 by temporarily switching ON the low-side transistor Q4 (or Q3, as the case may be) with a voltage pulse of duration P1 which is set such that an output voltage of the SMPS 200 remains at or above an initial output voltage value during the first switching period of operation of the SMPS 200 under control of the operational switching control signals. In other words, the pulse duration P1 is set to a value that allows the boot-strap capacitor $C_B$ to charge sufficiently and/or the parasitic capacitance $C_p$ of the low-side transistor (Q3 or Q4, as the case may be) to be discharged to the extent required to prevent the SMPS 200 from exhibiting a dip in its output voltage $V_{out}$ and thus sinking current from the load during or shortly after the start-up phase of operation. A single value for the duration P1 of the first pulse (which may be determined experimentally by trial and error, for example) may be stored in the aforementioned memory device. Alternatively, more than one such value may be stored in the memory in association with a respective sub-range of initial output voltage values, such that the switching controller 230 is able to select a sub-range and thus a pulse duration value P1 which corresponds the determined SMPS output voltage value.

Second Embodiment

In the above-described first embodiment the start-up switching control signals shown in FIG. 6, and the above-mentioned variant of this timing diagram, both have the drawback that the parasitic capacitance of the transistor Q3 (or, as the case may be, Q4) that is not switched by the first pulse is discharged through transformer 110, causing a small imbalance in the isolation transformer flux.

However, in the second embodiment of the present invention, the charging of the boot-strap capacitors $C_B$ in the boot-strap circuits of both high-side transistors Q1 and Q2 is performed by switching ON both Q3 and Q4 with the first voltage pulse applied to each of these transistors. At the same time, both of the parasitic capacitances of these low-side transistors Q3 and Q4 are discharged, which improves the accuracy of the reduced-pulse transformer balancing. Then, within the same switching period T, transistors Q2 and Q3 are switched ON, each by the second voltage pulse which is generated by the switching controller 230. This results in a timing diagram shown in FIG. 7, where the switching sequence after time t=0 proceeds according to the conventional scheme shown in FIG. 2. The second embodiment is otherwise the same as the above-described first embodiment and the description common features will therefore not be repeated.

Third Embodiment

In the third embodiment of the present invention, in order to minimize the number of PWM signals generated by the switching controller 230, transistors Q1 and Q4 are both controlled by a first PWM signal, and transistors Q2 and Q3 are both be controlled by a second PWM signal. In this case, the full start-up timing diagram takes the form shown in FIG. 8.

Figure 8:
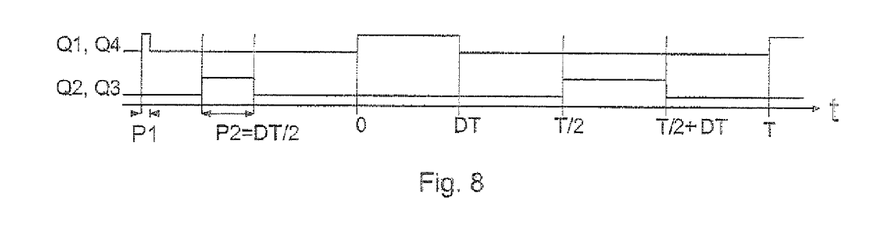
FIG. 8 shows a start-up switch timing diagram according to which an isolated SMPS according to a third embodiment starts up.

As shown in FIG. 8, the switching controller 230 starts up the SMPS 200 by generating a first voltage pulse of duration P1 for each of transistors Q1 and Q4 to temporarily switch them ON, and a subsequent second voltage pulse of duration P2 (preferably equal to DT/2) for each of transistors Q2 an Q3 to temporarily switch these transistors ON, thereby allowing the boot-strap capacitor $C_B$ in the boot-strap driving circuit of transistor Q2 to be charged before transistors Q2 and Q3 are turned ON by the second voltage pulses.

In the present embodiment, the charge in the parasitic capacitors $C_p$ associated with transistors Q2 and Q3 is discharged through the transformer 110, causing a small imbalance in the transformer. Since the boot-strap capacitor $C_B$ in the boot-strap driving circuit of transistor Q1 is not charged, Q1 is not switched ON by the first pulse and therefore does not pass a current to the transformer 110. Hence, the first (initialisation) pulse does not destroy the reduced-pulse transformer balancing, with exception of the imbalance caused by the discharge of the parasitic capacitances. The transformer flux balancing pulse applied to transistor Q3 allows the boot-strap capacitor associated with transistor Q1 to charge up at that stage, thereby allowing Q1 be switched on more effectively by the first full pulse (0<t<DT) of normal operation.

The third embodiment is otherwise the same as the above-described first embodiment and the description of common features will therefore not be repeated.

Fourth Embodiment

Figure 9:
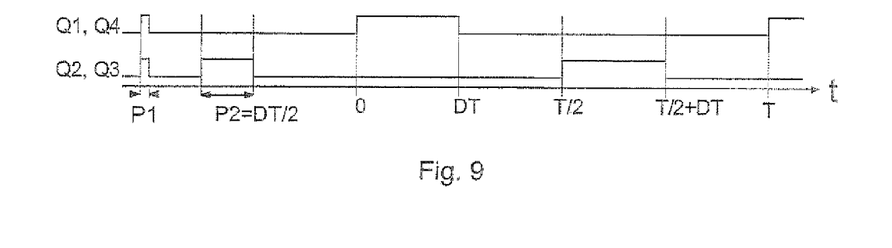
FIG. 9 shows a start-up switch timing diagram according to which an isolated SMPS according to a fourth embodiment starts up.

The fourth embodiment of the present invention is a variant of the above-described third embodiment, and differs in that the switching controller 230 is configured to apply initialisation pulses on both the first and second PWM signals for the initialisation, as shown in FIG. 9.

As shown in FIG. 9, the switching controller 230 starts up the SMPS 200 by generating a first voltage pulse of duration P1 for each of the transistors Q1 to Q4 on the primary side to temporarily switch them ON, and a subsequent second voltage pulse of duration P2 (again preferably equal to DT/2) for each of transistors Q2 and Q3 to temporarily switch these transistors ON, thereby allowing both the boat-strap capacitors in both of the boot-strap driving circuits on the primary side to be charged before transistors Q2 and Q3 are turned ON by the second voltage pulses.

This switching scheme reduces the imbalance in the transformer 110 since the parasitic charge is discharged through transistors Q2 and Q3 instead of through the transformer 110. Since the initialisation pulses charge both of the boot-strap capacitors $C_B$, it is important to keep these first set of pulses very short since all of the transistors Q1 to Q4 are switched ON and there is therefore a risk that the full-bridge drive circuit may sustain damage through a short-circuit of the power supply's input rails (at ground and voltage $V_{in}$ in the above embodiments). This short circuit current is limited by an input filter choke.

In many applications, it is preferable for the switching controller 230 to start generating the operational switching control signals in the switching period that immediately follows the single switching period during which the start-up switching control signals are generated (as shown in FIGS. 6 to 9), in order to keep the flux in the transformer balanced.

Figure 10:
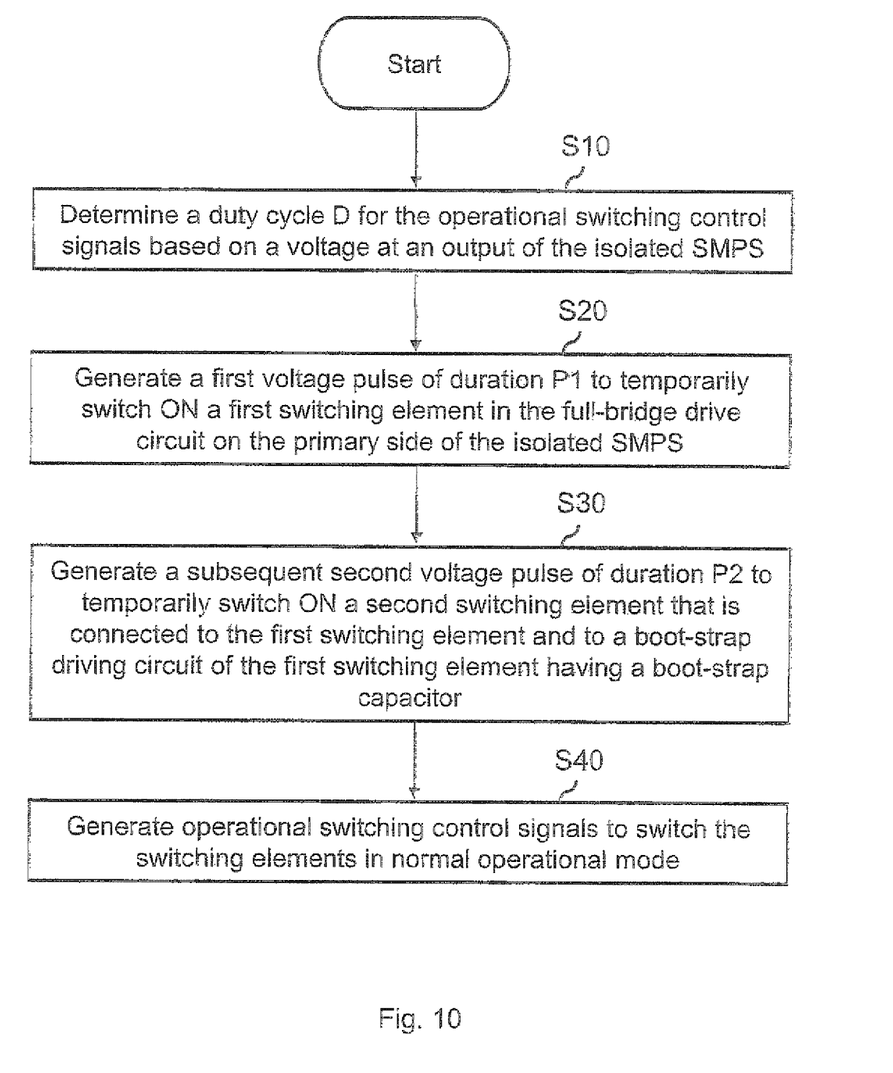
FIG. 10 is a flow chart illustrating the operation of the SMPS according to an embodiment from start-up.

The key operations performed by the switching controller 230 to start up the SMPS 200 in the above-described embodiments are shown in FIG. 10.

In step S10, the switching controller 230 determines a duty cycle for the operational switching control signals based on a voltage at an output of the isolated SMPS 200.

In steps S20 and S30, the switching controller 230 generates the start-up switching control signals during a single switching period T.

More specifically, in step S20, the switching controller 230 generates a first voltage pulse of duration P1 to temporarily switch ON a first (low-side) switching element in the full-bridge drive circuit on the primary side of the isolated SMPS.

Then, in step S30, the switching controller generates a subsequent second voltage pulse of duration P2 to temporarily switch ON a second (high-side) switching element that is connected to the first switching element and to a boot-strap driving circuit of the first switching element that has a boot-strap capacitor. The durations of the first and second pulses P1 and P2 are such that P1<P2 and P2<DT.

With the start-up switching control complete, converter operation in the normal operational mode follows in step S40.

[Experimental Results]

A practical implementation of the SMPS according to the above-described third embodiment (which is operable to start up according to the timing diagram shown in FIG. 8) has been made by the inventors and its performance assessed and compared with that of a known SMPS which starts up according to the timing diagram shown in FIG. 3.

In these experiments, the pre-bias situation is obtained by a large charged capacitor connected at the output. The pre-bias voltage was 11.5V and the nominal output voltage $V_{out}$ of the SMPS was 12V.

Figure 11:
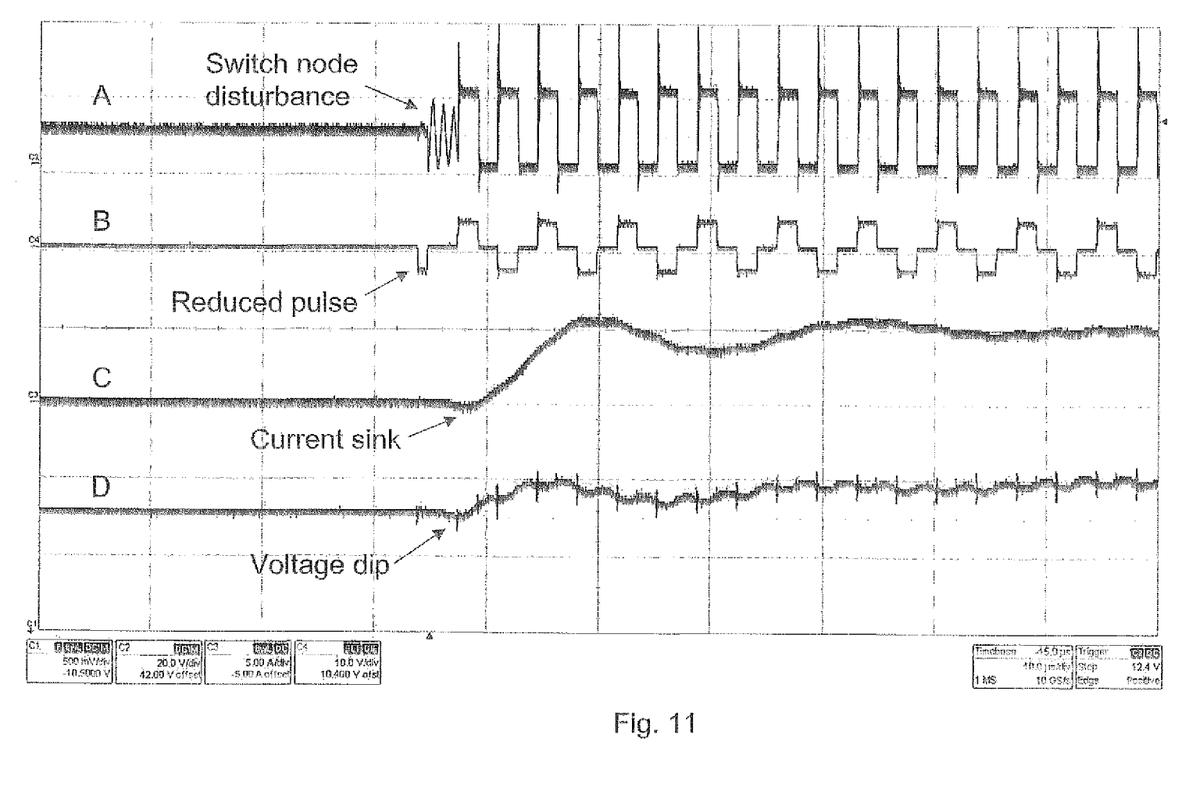
FIG. 11 shows measurements of the mid-tap voltage, gate signal on a low-side transistor, the output current and the output voltage during and after start-up of a background example isolated SMPS, which starts up according to the timing diagram shown in FIG. 3.

FIG. 11 shows measurements of various parameters of the SMPS which starts up according to the timing sequence of FIG. 3. In particular, trace A in FIG. 10 shows the voltage on the mid-tap of the transformer 100, trace B shows the gate signal on a low-side PET on the primary side, trace C shows the input current to the pre-charged capacitor, and trace D shows converter's output voltage $V_{out}$.

Since the boot-strap capacitor is not charged properly during the transformer flux balancing pulse, energy is not transferred to the secondary side, and noise is observed at the switch node (see trace A). The result is that the transformer becomes unbalanced, causing the SMPS to sink current from the pre-bias capacitor, as shown in trace C. The output voltage $V_{out}$ dips accordingly, as shown in trace D.

Figure 12:
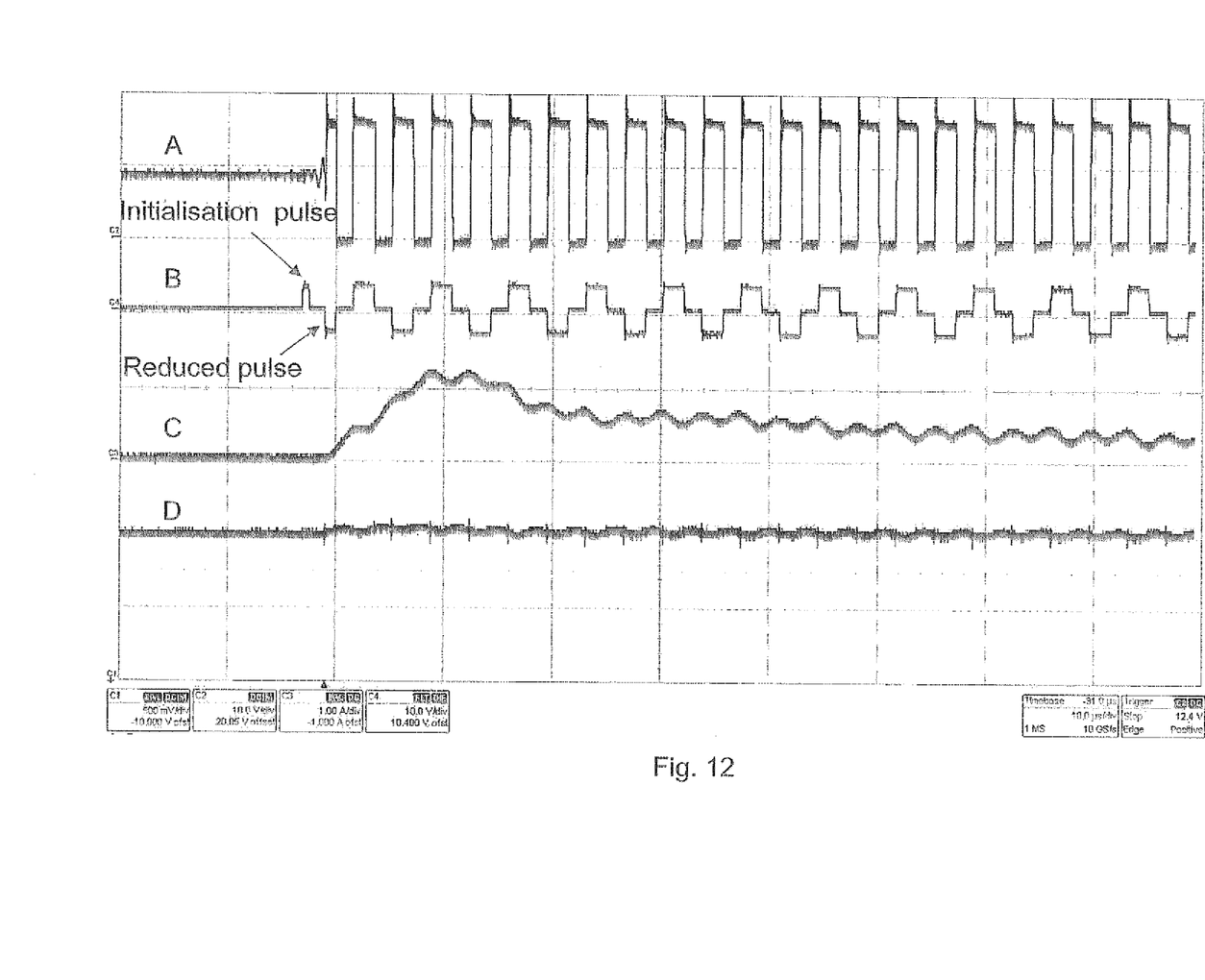
FIG. 12 shows measurements of the mid-tap voltage, gate signal on a low-side transistor, the output current and the output voltage during and after start-up of an isolated SMPS according to an embodiment of the present invention which starts up according to the timing diagram shown in FIG. 8.

FIG. 12 shows measurements of various parameters of the SMPS which starts up according to the timing sequence of FIG. 8. Traces A-D in FIG. 12 show the variations with time of the same parameters as the correspondingly labelled traces n FIG. 11.

In this set of measurements, the initialisation pulse is used, in accordance with the switch timing diagram of FIG. 8. The switch node disturbance (trace A in FIG. 12) during the initialisation pulse is reduced compared with the former measurement. In the SMPS according to the embodiment of the present invention, energy is properly transferred to the secondary side in the following transformer flux balancing pulse. Hence, the transformer becomes balanced and, as shown in traces C and D in FIG. 12, the current to the load capacitor is always positive, and the output voltage does not show a dip.

[Modifications and Variations]

Many modification and variations can be made to the embodiments described above.

For example, in the embodiments described above the switching controller 230 is implemented in the form of a programmable processing apparatus having a data processor (e.g. a micro-processor) which provides the functionality of the switching controller 230 by executing software instructions stored in an instruction store forming part of the programmable processing apparatus. However, it will be appreciated that the switching controller 230 may alternatively be implemented in dedicated hardware, e.g. a field-programmable gate array (FPGA).

Furthermore, although the switching controller 230 according to the above embodiments is configured to generate the first and second start-up voltage pulses within a single switching period T, the switching controller 230 may alternatively generate these pulses within a start-up time period different from the switching period T, which will depend on the characteristics of the SMPS circuit such as the size of the boot-strap capacitors $C_B$, and the leakage in the boot-strap capacitors and the high-side drivers. Furthermore, the interval between the initialisation pulse of duration P1 and the subsequent transformer flux balancing pulse of duration P2 may vary between SMPS implementations embodying the present invention, and will depend at least partly on transformer properties (e.g. the stored magnetic energy will decay on a timescale which is dependent on the transformer core material). In general, the pulse durations P1 and P2 and the time interval between the first and second pulses should be set such that the output voltage $V_{out}$ of the SMPS remains at or above an initial output voltage value during the first switching period of operation of the SMPS in the operational mode, so that a dip in the output voltage and the consequent current sinking does not occur. Those skilled in the art will be readily able to set values of these parameters that are appropriate for the particular SMPS implementation at hand using familiar multi-parameter optimisation methods, trial and error etc.

The invention claimed is:

1. An isolated switched mode power supply (SMPS), comprising:
    a switching controller operable to generate start-up switching control signals during start-up of the isolated SMPS, and operational switching control signals of period T during subsequent operation of the isolated SMPS;
    a transformer having a primary winding;
    a full-bridge drive circuit arranged to drive the primary winding of the transformer in response to the switching control signals, the full-bridge drive circuit having:
        a first switching element;
        a boot-strap driving circuit arranged to switch the first switching element in response to the switching control signals, the boot-strap driving circuit having a boot-strap capacitor; and
        a second switching element connected to the first switching element and to the boot-strap driving circuit, and arranged to conduct a current to charge the boot-strap capacitor when switched ON in response to the switching control signals;
    wherein the switching controller is operable to start up the isolated SMPS by:

determining a duty cycle D for the operational switching control signals based on a voltage at an output of the isolated SMPS; and generating the start-up switching control signals, comprising a first voltage pulse of duration P1 to temporarily switch ON the second switching element, and a subsequent second voltage pulse of duration P2 to temporarily switch ON the first switching element, wherein P1<P2 and P2<DT, where T is a switching period of the isolated SMPS, thereby allowing the boot-strap capacitor to be charged before the first switching element is turned ON by the second voltage pulse.

2. The isolated switched mode power supply according to claim 1, wherein the switching controller is arranged to generate the second voltage pulse of duration P2 such that P2≈DT/2.

3. The isolated switched mode power supply according to claim 1, wherein the switching controller is arranged to start up the isolated SMPS by temporarily switching ON the second switching element with a voltage pulse of duration P1 which is set such that an output voltage of the isolated SMPS remains at or above an initial output voltage value during the first switching period of operation of the isolated SMPS under control of the operational switching control signals.

4. The isolated switched mode power supply according to claim 1, wherein the full-bridge drive circuit further comprises:

a third switching element;

a second boot-strap driving circuit arranged to switch the third switching element in response to the switching control signals, the second boot-strap driving circuit having a boot-strap capacitor; and a fourth switching element connected to the third switching element and to the second boot-strap driving circuit, and arranged to conduct a current to charge the boot-strap capacitor of the second boot-strap driving circuit when switched ON in response to the switching control signals, wherein the first and second switching elements are connected to the third and fourth switching elements in a full-bridge configuration to drive the primary winding of the transformer in response to the switching control signals, and wherein the switching controller is operable to start up the isolated SMPS by generating a first voltage pulse of duration P1 for each of the second and fourth switching elements to temporarily switch ON the second and fourth switching elements, and a subsequent second voltage pulse of duration P2 for each of the first and fourth switching elements to temporarily switch ON the first and fourth switching elements, thereby allowing both the boot-strap capacitor and the second boot-strap capacitor to be charged before the first and fourth switching elements are turned ON by the second voltage pulses.

5. The isolated switched mode power supply according to claim 1, wherein the full-bridge drive circuit further comprises:

a third switching element;

a second boot-strap driving circuit arranged to switch the third switching element in response to the switching control signals, the second boot-strap driving circuit having a boot-strap capacitor; and a fourth switching element connected to the third switching element and to the second boot-strap driving circuit, and arranged to conduct a current to charge the boot-strap capacitor of the second boot-strap driving circuit when switched ON in response to the switching control signals, wherein the first and second switching elements are connected to the third and fourth switching elements in a full-bridge configuration to drive the primary winding of the transformer in response to the switching control signals, and wherein the switching controller is arranged to start up the isolated SMPS by generating a first voltage pulse of duration P1 for each of the second and third switching elements to temporarily switch ON the second and third switching elements, and a subsequent second voltage pulse of duration P2 for each of the first and fourth switching elements to temporarily switch ON the first and fourth switching elements, thereby allowing the boot-strap capacitor in the first boot-strap driving circuit to be charged before the first and fourth switching elements are turned ON by the second voltage pulses.

6. The isolated switched mode power supply according to claim 1, wherein the full-bridge drive circuit further comprises:

a third switching element;

a second boot-strap driving circuit arranged to switch the third switching element in response to the switching control signals, the second boot-strap driving circuit having a boot-strap capacitor; and a fourth switching element connected to the third switching element and to the second boot-strap driving circuit, and arranged to conduct a current to charge the boot-strap capacitor of the second boot-strap driving circuit when switched ON in response to the switching control signals, wherein the first and second switching elements are connected to the third and fourth switching elements in a full-bridge configuration to drive the primary winding of the transformer in response to the switching control signals, and wherein the switching controller is operable to start up the isolated SMPS by generating a first voltage pulse of duration P1 for each of the first, second, third and fourth switching elements to temporarily switch ON the first, second, third and fourth switching elements, and a subsequent second voltage pulse of duration P2 for each of the first and fourth switching elements to temporarily switch ON the first and fourth switching elements, thereby allowing both the boot-strap capacitor and the second boot-strap capacitor to be charged before the first and fourth switching elements are turned ON by the second voltage pulses.

7. The isolated switched mode power supply according to claim 1, wherein the switching controller is arranged to start generating the operational switching control signals in the switching period that immediately follows a switching period during which the start-up switching control signals are generated.

8. A method of starting up an isolated switched mode power supply (SMPS) the isolated SMPS comprising:

a switching controller operable to generate start-up switching control signals during start-up of the isolated SMPS, and operational switching control signals of period T during subsequent operation of the isolated SMPS;

a transformer having a primary winding;

a full-bridge drive circuit arranged to drive the primary winding of the transformer in response to the switching control signals, the full-bridge drive circuit having:

a first switching element;

a boot-strap driving circuit arranged to switch the first switching element in response to the switching control signals, the boot-strap driving circuit having a boot-strap capacitor; and a second switching element connected to the first switching element (Q23 and to the boot-strap driving circuit, and arranged to conduct a current to charge the boot-strap capacitor when switched ON in response to the switching control signals, the method comprising:

determining a duty cycle D for the operational switching control signals based on a voltage at an output of the isolated SMPS; and generating the start-up switching control signals by:

generating a first voltage pulse of duration P1 to temporarily switch ON the second switching element; and generating a subsequent second voltage pulse of duration P2 to temporarily switch ON the first switching element, wherein P1<P2 and P2<DT, T being a switching period of the isolated SMPS, thereby allowing the boot-strap capacitor to be charged before the first switching element is turned ON by the second voltage pulse.

9. The method according to claim 8, wherein the switching controller generates the second voltage pulse of duration P2 such that P2≈DT/2.

10. The method according to claim 8, wherein the isolated SMPS is started up by temporarily switching ON the second switching element with a voltage pulse of duration P1 which is set such that an output voltage of the isolated SMPS remains at or above an initial output voltage value during the first switching period of operation of the isolated SMPS under control of the operational switching control signals.

11. The method according to claim 8, wherein the full-bridge drive circuit further comprises:

a third switching element;

a second boot-strap driving circuit arranged to switch the third switching element in response to the switching control signals, the second boot-strap driving circuit having a boot-strap capacitor; and a fourth switching element connected to the third switching element and to the second boot-strap driving circuit, and arranged to conduct a current to charge the boot-strap capacitor of the second boot-strap driving circuit when switched ON in response to the switching control signals, wherein the first and second switching elements are connected to the third and fourth switching elements in a full-bridge configuration to drive the primary winding of the transformer in response to the switching control signals, and wherein the start-up switching control signals are generated during the single switching period T by:

generating a first voltage pulse of duration P1 for each of the second and fourth switching elements to temporarily switch ON the second and fourth switching elements; and generating a subsequent second voltage pulse of duration P2 for each of the first and fourth switching elements to temporarily switch ON the first and fourth switching elements, thereby allowing both the boot-strap capacitor and the second boot-strap capacitor to be charged before the first and fourth switching elements are turned ON by the second voltage pulses.

12. The method according to claim 8, wherein the full-bridge drive circuit further comprises:

a third switching element;

a second boot-strap driving circuit arranged to switch the third switching element in response to the switching control signals, the second boot-strap driving circuit having a boot-strap capacitor; and a fourth switching element connected to the third switching element and to the second boot-strap driving circuit, and arranged to conduct a current to charge the boot-strap capacitor of the second boot-strap driving circuit when switched ON in response to the switching control signals, wherein the first and second switching elements are connected to the third and fourth switching elements in a full-bridge configuration to drive the primary winding of the transformer in response to the switching control signals, and wherein the start-up switching control signals are generated during the single switching period T by:

generating a first voltage pulse of duration P1 for each of the second and third switching elements to temporarily switch ON the second and third switching elements; and generating a subsequent second voltage pulse of duration P2 for each of the first and fourth switching elements to temporarily switch ON the first and fourth switching elements, thereby allowing the boot-strap capacitor in the first boot-strap driving circuit to be charged before the first and fourth switching elements are turned ON by the second voltage pulses.

13. The method according to claim 8, wherein the full-bridge drive circuit further comprises:

a third switching element;

a second boot-strap driving circuit arranged to switch the third switching element in response to the switching control signals, the second boot-strap driving circuit having a boot-strap capacitor; and a fourth switching element connected to the third switching element and to the second boot-strap driving circuit, and arranged to conduct a current to charge the boot-strap capacitor of the second boot-strap driving circuit when switched ON in response to the switching control signals, wherein the first and second switching elements are connected to the third and fourth switching elements in a full-bridge configuration to drive the primary winding of the transformer in response to the switching control signals, and wherein the start-up switching control signals are generated during the single switching period T by:

generating a first voltage pulse of duration P1 for each of the first, second, third and fourth switching elements to temporarily switch ON the first, second, third and fourth switching elements; and generating a subsequent second voltage pulse of duration P2 for each of the first and fourth switching elements to temporarily switch ON the first and fourth switching elements, thereby allowing both the boot-strap capacitor and the second boot-strap capacitor to be charged before the first and fourth switching elements are turned ON by the second voltage pulses.

14. The method according to claim 8, wherein the switching controller starts generating the operational switching control signals in the switching period that immediately follows a switching period during which the start-up switching control signals are generated.

* * * * *

UNITED STATES PATENT AND TRADEMARK OFFICE
CERTIFICATE OF CORRECTION

PATENT NO. : 8,456,867 B1
APPLICATION NO. : 13/383632
DATED : June 4, 2013
INVENTOR(S) : Karlsson et al.

It is certified that error appears in the above-identified patent and that said Letters Patent is hereby corrected as shown below:

In the Specification

In Column 2, Line 41, delete "present" and insert -- the present --, therefor.

In Column 3, Line 37, delete "start" and insert -- start of --, therefor.

In Column 4, Line 29, delete "i.e." and insert -- (i.e. --, therefor.

In Column 4, Line 65, delete "input voltage" and insert -- input voltage $V_{in}$, --, therefor.

In Column 5, Line 1, delete "divided" and insert -- is divided --, therefor.

In Column 8, Line 64, delete "22," and insert -- P2, --, therefor.

In Column 9, Line 9, delete "F1" and insert -- P1 --, therefor.

In Column 9, Line 41, delete "corresponds" and insert -- corresponds to --, therefor.

In Column 10, Line 2, delete "common" and insert -- of common --, therefor.

In Column 10, Line 36, delete "Q1" and insert -- Q1 to --, therefor.

In Column 10, Line 56, delete "boat-strap" and insert -- boot-strap --, therefor.

In Column 11, Line 14, delete "cycle" and insert -- cycle D --, therefor.

In Column 11, Line 47, delete "PET" and insert -- FET --, therefor.

In Column 11, Line 61, delete "n" and insert -- in --, therefor.

Signed and Sealed this
First Day of October, 2013

Teresa Stanek Rea
*Deputy Director of the United States Patent and Trademark Office*

CERTIFICATE OF CORRECTION (continued)
U.S. Pat. No. 8,456,867 B1

In the Claims

In Column 12, Line 46, in Claim 1, delete "(SMPS)," and insert -- (SMPS) --, therefor.

In Column 15, Line 6, in Claim 8, delete "(Q23 and" and insert -- and --, therefor.